US011473679B2

(12) United States Patent
Guan et al.

(10) Patent No.: US 11,473,679 B2
(45) Date of Patent: Oct. 18, 2022

(54) SHOCK WAVE MECHANICAL SEAL

(71) Applicant: Flowserve Management Company, Irving, TX (US)

(72) Inventors: Cheng-Kang Guan, Murrieta, CA (US); Daniel A. Nelson, Temecula, CA (US); Chris John Riché, Jr., Murrieta, CA (US)

(73) Assignee: Flowserve Management Company, Irving, TX (US)

( * ) Notice: Subject to any disclaimer, the term of this patent is extended or adjusted under 35 U.S.C. 154(b) by 171 days.

(21) Appl. No.: 17/142,351

(22) Filed: Jan. 6, 2021

(65) Prior Publication Data

US 2021/0156473 A1    May 27, 2021

Related U.S. Application Data

(63) Continuation-in-part of application No. 16/487,322, filed as application No. PCT/US2017/068095 on Dec. 22, 2017, now abandoned.
(Continued)

(51) Int. Cl.
*F16J 15/34* (2006.01)
*F16J 15/16* (2006.01)
*F16J 15/54* (2006.01)

(52) U.S. Cl.
CPC ......... *F16J 15/164* (2013.01); *F16J 15/3416* (2013.01); *F16J 15/54* (2013.01)

(58) Field of Classification Search
CPC ......... F16J 15/3416; F16J 15/164; F16J 15/48
See application file for complete search history.

(56) References Cited

U.S. PATENT DOCUMENTS 4,836,561 A * 6/1989 Lebeck ................ F16J 15/3428
277/400
4,887,395 A  12/1989 Lebeck
(Continued)

FOREIGN PATENT DOCUMENTS

JP      2006177500 A    7/2006
KR      101066295 B1    9/2011
(Continued)

OTHER PUBLICATIONS

PCT Search Report and Written Opinion for Appl No. PCT/US2017/068095, dated Apr. 17, 2018, 11 pages.
(Continued)

*Primary Examiner* — Vishal A Patel
(74) *Attorney, Agent, or Firm* — Maine Cernota & Rardin

(57) ABSTRACT

An end face mechanical seal for a high pressure, compressible fluid includes metal or ceramic seal faces separated by a seal gap having at least one supersonic region that accelerates the fluid in the leakage direction, producing a shockwave that reduces fluid pressure to significantly reduce viscous heating and gap length. A choke width of the seal gap formed between the converging and diverging segments of the first supersonic region is between 50 and 200 microinches, and upper and lower boundaries thereof are flat, with combined slopes of less than 10 degrees. A total length of all of the supersonic regions is less than 0.1 inches. A non-supersonic region can further reduce fluid pressure by inducing viscous stresses. The seal can be configured axially or radially, and can be used as a pre-conditioner in combination with a conventional downstream mechanical fluid seal.

13 Claims, 9 Drawing Sheets

Related U.S. Application Data

(60) Provisional application No. 62/473,535, filed on Mar. 20, 2017.

(56) References Cited

U.S. PATENT DOCUMENTS

| | | |
|---|---|---|
| 6,109,618 A | 8/2000 | Dietle |
| 9,175,542 B2 | 11/2015 | Bailey |
| 2006/0033287 A1 | 2/2006 | Rago |
| 2006/0214380 A1 | 9/2006 | Dietle |
| 2008/0284105 A1 | 11/2008 | Vasager et al. |
| 2009/0001671 A1 | 1/2009 | Dietle |
| 2010/0264603 A1 | 10/2010 | Schroeder |
| 2011/0024987 A1 | 2/2011 | Crowley |
| 2012/0061921 A1 | 3/2012 | Maskaliunas |
| 2012/0156015 A1 | 6/2012 | Devi et al. |
| 2013/0241153 A1 | 9/2013 | Garrison |
| 2014/0197601 A1 * | 7/2014 | Marlow ............ F01D 11/005 277/431 |
| 2016/0053895 A1 | 2/2016 | Otschik et al. |
| 2018/0274675 A1 | 9/2018 | Mittler |
| 2018/0335146 A1 | 11/2018 | Dietle |
| 2019/0383397 A1 | 12/2019 | Otschik et al. |

FOREIGN PATENT DOCUMENTS

| | | |
|---|---|---|
| WO | 2010133126 A1 | 11/2010 |
| WO | 2014162688 A1 | 10/2014 |

OTHER PUBLICATIONS

International Preliminary Report on Patentability and Written Opinion for Appl No. PCT/US2017/068095, dated Oct. 3, 2019, 8 pages.
Office Action for U.S. Appl. No. 16/487,322, dated Jul. 13, 2020, 24 Pages.
Office Action for European Patent Appl. No. 17902299.1, dated Jun. 29, 2020, 5 Pages.
European Search Report for Appl. No. 17902299.1, dated Jun. 17, 2020, 4 Pages.
Office Action for U.S. Appl. No. 16/487,322, dated Sep. 16, 2020, 13 Pages.

\* cited by examiner

SHOCK WAVE MECHANICAL SEAL

RELATED APPLICATIONS

This application is a continuation in part of U.S. patent application Ser. No. 16/487,322, filed on Aug. 20, 2019. U.S. application Ser. No. 16/487,322 is a national phase application filed under 35 USC § 371 of PCT Application No. PCT/US17/68095 with an international filing date of Dec. 22, 2017. PCT/US17/68095 claims the benefit of U.S. Provisional Application No. 62/473,535, filed Mar. 20, 2017. All of these applications are herein incorporated by reference in their entirety for all purposes.

FIELD OF THE INVENTION

The invention relates to end face mechanical seals, and more particularly, to end face mechanical seals that are used to seal high pressure compressible fluids.

BACKGROUND OF THE INVENTION

End face mechanical seals are commonly used in many applications to minimize the leakage of a pressurized fluid between rotating and stationary components in rotating shaft equipment such as pumps and compressors. As used herein, the term "end face mechanical seal" refers to a type of seal that comprises parallel, opposing surfaces that are sealed to the rotating shaft and to the housing respectively, and are referred to herein as the rotating and stationary "seal faces." Typically, the rotating seal face is a surface of a rotating seal ring that surrounds and is sealed and fixed to the rotating shaft, while the stationary seal face is a surface of a stationary seal ring, such as a bushing, that surrounds the rotating shaft and is fixed to a housing. By convention, these two sealing rings are referred to as the "seal rings" of the end face mechanical seal. Typically, the seal rings are arranged coaxially about the rotating shaft, either as concentric tubes or as opposing rings or annuli. In the former case, the outer surface of the inner seal ring is closely adjacent to the inner surface of the outer seal ring. In the latter case, opposing sides of the annular seal rings are the seal faces and are arranged in close proximity to each other.

During operation of an end face mechanical seal, the seal faces of the rotating and stationary seal rings are separated by a very narrow seal gap, typically less than 10 microns, and in some cases less than 1 micron. During operation of the end face mechanical seal the seal rings do not touch. Instead, the seal gap is filled with a thin layer of process fluid. As a result, the process fluid leaks slowly through the seal gap in a "leakage direction" from a higher-pressure side of the seal gap to a lower-pressure side of the seal gap, but at a leakage rate that is negligible and generally not noticeable.

The very small seal gap of an end face mechanical seal induces large viscous stresses on the process fluid that enters the seal gap, thereby reducing the fluid pressure of the process fluid as it travels through the seal gap. Reducing the fluid pressure in this way results in a very small fluid flow rate through the gap, thus effectively sealing the process fluid without requiring physical contact between the seal rings.

It is highly important that the seal rings of an end face mechanical seal maintain their shapes and alignment during all operating conditions, including when exposed to vibrations, changes in rotation speed, changes in temperature, and/or fluctuations in process fluid pressure. Also, the seal rings must be resistant to the physical wear that occurs when the seal faces of the seal rings make temporary frictional contact, for example when the rotating seal ring begins and ends its rotation. As a result, it is necessary that both of the seal rings of an end face mechanical seal be made from very hard materials having a Young's modulus of at least 5 GPa, and in embodiments at least 10 GPa. Typically, the rotating and stationary seal rings are made from metals and/or ceramics (where graphite is considered to be a type of ceramic). If more than one material is included in a rotating or stationary seal ring of an end face mechanical seal, then at least the seal faces of the rotating and stationary seal rings must be made from very hard materials having a Young's modulus greater than 5 GPa, and in embodiments greater than 10 GPa, such as a metal or a ceramic.

An important byproduct of the viscous stress that is imposed on the process fluid in the seal gap is viscous heating, which can lead to overheating of the seal and chemical breakdown of the fluid. This heating typically has a significant influence on the design of the seal rings in terms of material selection, geometry, and manufacturing.

In some cases, the seal faces of the seal rings of an end face mechanical seal are everywhere flat and parallel to each other. Other end face mechanical seals include grooves, ridges, dimples, and/or other shaping features applied to one or both of the seal faces of the seal rings, for example to encourage process fluid to enter and fill the seal gap.

This traditional approach to end face mechanical seals, which depends on the application of viscus stress to reduce the fluid pressure as the fluid travels through the seal gap, is effective for many applications. However, this approach becomes less efficient as the pressure of the sealed fluid increases, and/or its viscosity decreases. In particular, conventional end face mechanical seals are sometimes unsatisfactory for sealing seal high pressure and ultrahigh pressure compressible fluids such as highly pressurized gasses.

What is needed, therefore, is an end face mechanical seal that is more efficient and effective than conventional end face mechanical seals in sealing high pressure and ultrahigh pressure compressible fluids.

SUMMARY OF THE INVENTION

The present invention is an end face mechanical seal that is more efficient and effective than conventional end face mechanical seals in sealing high pressure and ultrahigh pressure and/or high temperature compressible fluids. The present invention falls within the definition of an end face mechanical seal as given above, in that the present invention includes opposing rotating and stationary seal faces that do not touch during operation of the seal, but instead are separated by a narrow seal gap, such that process fluid leaks very slowly through the seal gap in a "leakage direction" from a higher pressure side of the seal gap to a lower pressure side of the seal gap. In addition, as is also the case with traditional end face mechanical seals, the seal faces are made from materials such as metals and ceramics having a Young's modulus of greater than 5 GPa, and in embodiments greater than 10 GPa. In some embodiments, the rotating seal face is formed in a surface of the shaft itself, while in other embodiments the rotating seal face is a surface of a seal ring that surrounds and is fixed and sealed to the rotating shaft.

As is the case with conventional end face mechanical seals, the present invention includes embodiments wherein the seal faces are arranged coaxially about the rotating shaft, either as concentric tubes or as opposing rings or annuli. In the former case, the seal faces are essentially cylindrical in shape and the leakage direction is axial, i.e. parallel to the rotating shaft. Embodiments of this type are sometimes referred to herein as having an "axial" configuration. In the latter case, the seal faces are essentially flat and annular in shape, and lie substantially in planes that are perpendicular to the rotating shaft, whereby the leakage direction is radial. Embodiments of this type are sometimes referred to herein as having "radial" configurations.

Unlike conventional end face mechanical seals, however, the end face mechanical seal of the present invention does not rely entirely on viscous stresses to reduce the pressure of the compressible fluid as it flows through the seal gap in the leakage direction. Instead, the end face mechanical seal of the present invention reduces the pressure of the compressible fluid within the seal gap by causing the compressible fluid to be accelerated in the "leakage" direction within the seal gap to a supersonic condition, and then to undergo a shockwave that reduces the stagnation pressure of the fluid. This approach substantially reduces viscous heating and enables large pressure differentials, thereby enabling an effective seal to be established over a distance within the seal gap that is much shorter than is required for conventional end face mechanical seals.

More specifically, at least one of the opposing seal faces includes shaping that creates at least one "supersonic region" within the seal gap. This shaping of at least one of the seal faces is in the leakage direction of the seal gap, while, in embodiments, the gap does not vary in a direction perpendicular to the leakage direction. Accordingly, the supersonic region or regions of the seal gap are described herein in terms of two-dimensional shape "profiles" that present the gap width as a function of location along the leakage direction.

Within each of the one or more supersonic regions, the shape profile of the seal gap includes a converging segment in which the seal gap narrows in the leakage direction, followed by a diverging segment in which the gap widens in the leakage direction. At the boundary between the converging and diverging segments of each supersonic region, there is a local minimum of the gap width, which is referred to herein as the "choke width" of the supersonic region.

Within each supersonic region, the fluid is accelerated to a supersonic condition, such that a shockwave is induced shortly after the fluid enters the diverging segment. The stagnation pressure of the fluid is consequently decreased by the action of the shockwave, causing a backpressure that significantly reduces leakage of the fluid through the gap.

The number and the dimensions of the supersonic regions included in various embodiments are determined according to the fluid pressure within the sealed volume and the desired relative pressure drop.

In various embodiments, the converging-diverging geometry of each supersonic region is imposed on one or both of the seal faces. In embodiments, the supersonic regions are located near the edges of the seal faces where the pressurized fluid from the sealed fluid volume enters the gap between the seal faces.

It should be noted that the first supersonic region that is encountered by a fluid flowing in the fluid direction from a higher pressure side of the seal gap is referred to herein as the "first" supersonic region. It will be understood that references herein to the "first" supersonic region do not necessarily imply that a plurality of supersonic regions are included in the seal gap.

Principle of Operation

Within each of the supersonic regions of the disclosed seal, the compressible fluid is accelerated within the converging segment of the supersonic region as the gap narrows, until it reaches the minimum gap clearance, i.e. the "choke" width. At this location, the fluid reaches a "choked" condition, where the fluid velocity cannot increase beyond Mach 1. As the fluid subsequently enters the diverging segment of the supersonic region, the gap widens, further accelerating the flow of the fluid to a supersonic condition, whereupon back-pressure imposed by downstream fluid induces a standing normal shockwave in the diverging segment. Although the static pressure of the fluid after the shockwave is much higher than the static pressure immediately upstream of the shockwave, the stagnation pressure of the fluid is greatly reduced, and is a function of the maximum Mach number that is reached in the diverging segment before the shock wave. The amount of pressure drop in each supersonic section is therefore limited by the maximum Mach number that is achievable in each supersonic section.

In some embodiments, a Mach number of 4 or higher can tend to result in dissociation of the fluid within the shockwave and along the walls, and may begin to cause significant viscous heating effects on the walls. Accordingly, embodiments are designed such that the maximum Mach number of each section is 3 or less. Under these conditions, each section results in a pressure drop of approximately 50%. Thus, to achieve a desired pressure drop across the seal faces, the number of converging-diverging sections is selected according to the requirements of the embodiment, with higher sealed fluid pressures typically requiring a greater number of converging-diverging sections.

Of course, the requirement to achieve supersonic acceleration depends upon the fluid remaining compressible, and not, for example, condensing into in incompressible liquid or solid. As such, the number of converging-diverging sections may be limited if the fluid pressure drops below the minimum pressure and temperature that are required to maintain compressibility. In embodiments, the amount of fluid leakage through the seal gap is determined by the minimum gap width and area.

According to the present invention, the choke width in the first supersonic region is between 50 micro-inches and 200 micro-inches, and the overall length of all of the supersonic regions in combination is less than 0.1 inches. In embodiments, the overall length of all of the supersonic regions in combination is less than 0.01 inches.

In embodiments, upper and lower boundaries of the gap profile of the first supersonic region have constant slopes, i.e. are "flat," such that the gap widths within the converging and diverging segments of the first supersonic region are a linear function of position in the leakage direction. In these embodiments, the sum of the absolute values of the slopes relative to the leakage direction of the upper and lower boundaries of the gap profile of the first supersonic region is less than 10 degrees in both the converging segment and the diverging segment.

For example, within the first supersonic region, if either the upper boundary or the lower boundary of the gap profile is "horizontal," i.e. parallel to the leakage direction, then the absolute value of the slope of the other boundary of the gap profile is less than 10 degrees relative to the leakage direction for both the converging and diverging segments of the supersonic region. As another example, in embodiments where the two opposing boundaries of the first supersonic region are shaped as mirror images of each other within the first supersonic region, having equal and opposite slopes, then none of the absolute values of the slopes of the upper and lower boundaries of the gap profile will exceed 5 degrees.

If it is desirable to combine the shockwave pressure reduction method disclosed herein with viscous-effect pressure reduction, then the seal gap can be extended in the leakage direction downstream of the supersonic sections so as to further reduce the fluid pressure due to viscous dissipation. Similarly, a seal operating according to the principles disclosed here can be used as a "pre-conditioner," much like a throttle bushing, in combination with a conventional downstream fluid seal. In this way, a seal of the present invention can be used to enable existing seal technology that is well proven for sealing fluids at lower pressures to be applied in ultra-high-pressure applications.

Advantages

The present invention provides at least two significant technical advantages as compared to prior art end face mechanical seals. The first is the significant reduction in viscous heating associated with the action of the shockwaves that reduce the fluid pressure. Although some viscous heating is unavoidable due to the small gap clearances required by the invention, the principle by which the invention operates does not depend upon viscous effects (other than the shockwaves) to reduce the fluid pressure, and so embodiments can be designed to minimize viscous heating. The second advantage is the short length scale of the supersonic regions, in embodiments less than 0.01 inches for all of the supersonic regions combined, which can allow the seal faces to be scaled to very small sizes, reducing material costs and product envelopes.

The present invention is an end face mechanical seal configured for sealing a pressurized, compressible fluid, the end face mechanical seal. The end face mechanical seal includes a stationary seal face cooperative with and sealed to a housing that is penetrated by a rotating shaft, the stationary seal face being generally parallel to a rotating seal face that is cooperative with the rotating shaft, both of the stationary and rotating seal faces being made from materials having a Young's modulus that is greater than 5 GPa, the rotating and stationary seal faces being separated from each other by a seal gap extending in a leakage direction from a higher pressure side of the seal gap to a lower pressure side of the seal gap, the seal gap having a gap width that is everywhere constant in a direction perpendicular to the leakage direction, the gap width being characterized by a gap profile in the leakage direction.

The end face mechanical seal further comprises at least one supersonic region included in the seal gap, said at least one supersonic region including a first supersonic region that is first encountered by the compressible fluid as it flows from the higher pressure side of the seal gap to the lower pressure side of the seal gap. Each of the supersonic regions includes a converging segment within which the gap width decreases in the leakage direction, and a diverging segment immediately following the converging segment within which the gap width increases in the leakage direction, a local gap width minimum between the converging and diverging segments being referred to herein as a choke width.

For each of the supersonic regions, the converging and diverging segments thereof are configured to cause the compressible fluid, when flowing through the seal gap in the leakage direction, to be accelerated within the supersonic region into a supersonic state, so that a shockwave is formed by the compressible fluid within the diverging segment, thereby reducing a stagnation pressure of the compressible fluid. The choke width of the first supersonic region is between 50 micro-inches and 200 micro-inches, and a total width of all of the supersonic regions is less than 0.1 inches. Upper and lower boundaries of the gap profile in the converging and diverging segments of the first supersonic region have constant slopes, a sum of the absolute values of the constant slopes relative to the leakage direction being less than 10 degrees in each of the converging and diverging segments of the first supersonic region.

In embodiments, both of the seal faces are made from materials having a Young's modulus that is greater than 10 GPa. In some embodiments, each of the seal faces is made from either a metal or a ceramic.

In any of the above embodiments, the stationary seal face can be a surface of a bushing that surrounds the rotating shaft.

In any of the above embodiments, the rotating seal face can be a surface of a rotating seal ring that surrounds the rotating shaft, and is rotationally cooperative with and sealed to the rotating shaft.

In any of the above embodiments, a plurality of the supersonic regions can be included in the seal gap.

In any of the above embodiments, the first supersonic region is located proximal to the higher pressure side of the seal gap.

In any of the above embodiments, the end face mechanical seal can be axially configured, such that the seal faces are concentric about the rotating shaft and radially offset from each other, or the end face mechanical seal can be radially configured, such that the seal faces are perpendicular to the rotating shaft and axially offset from each other. For any of the axially configured embodiments, the rotating seal face can be formed in an outer surface of the rotating shaft, rather than in a bushing that surrounds the rotating shaft.

In any of the above embodiments, at least one of the supersonic regions can be configured to cause the compressible fluid when flowing through the seal gap in the leakage direction to be accelerated into a supersonic state having a Mach number of less than 4.

Any of the above embodiments can further include a viscosity-inducing section included in the seal gap, the viscosity-inducing section being offset in the leakage direction from all of the supersonic regions, the seal faces in the viscosity-inducing section being configured to induce viscous stresses on the compressible fluid within the viscosity-inducing section, thereby further reducing a stagnation pressure of the compressible fluid.

In any of the above embodiments, at least one of the seal faces can be parallel to the leakage direction throughout the seal gap.

And in any of the above embodiments, the total width of all of the supersonic regions can be less than 0.01 inches.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1A:
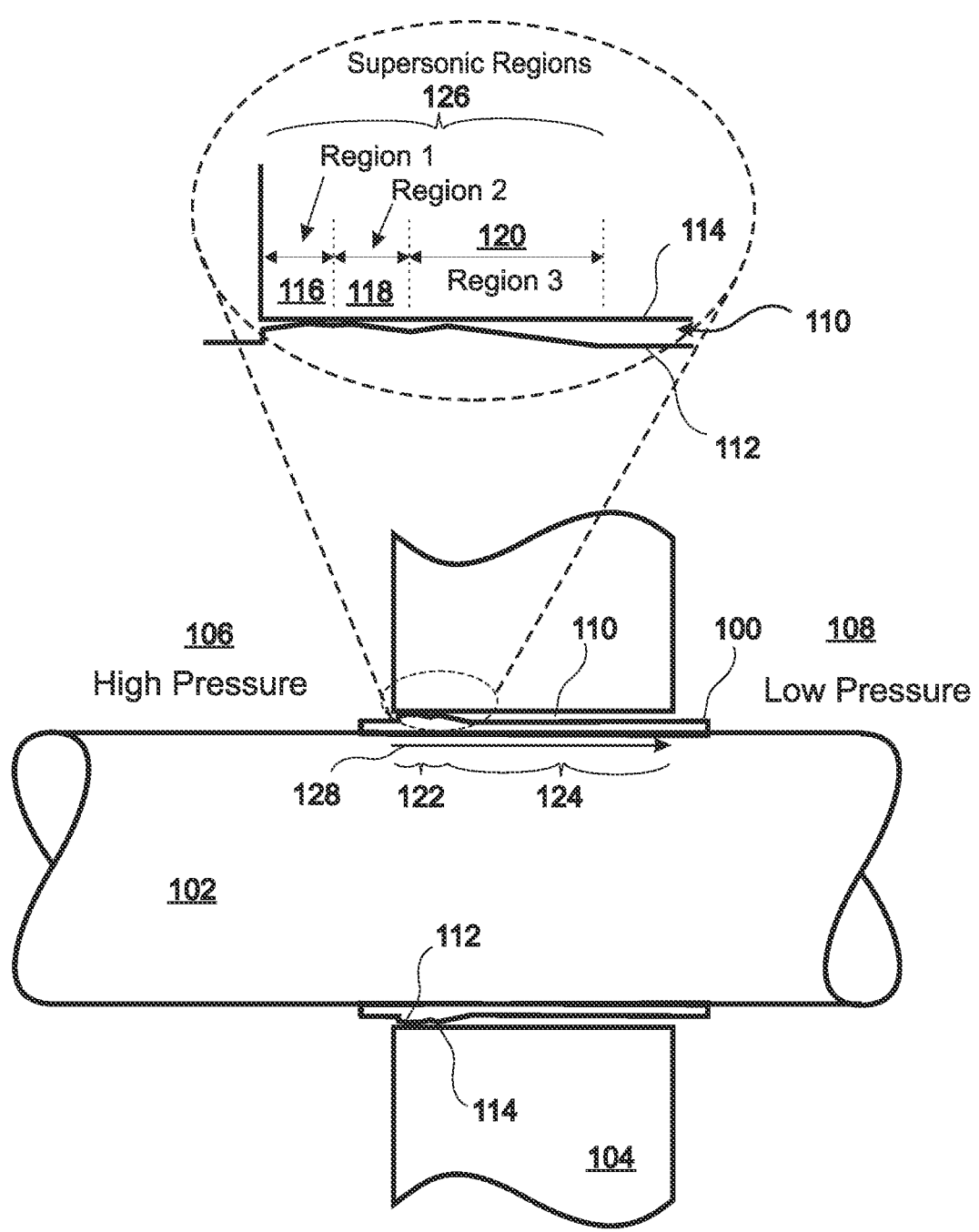
FIG. 1A is a cross-sectional side view of an embodiment of the present invention wherein the seal faces are concentric tubes surrounding the shaft.
Figure 1B:
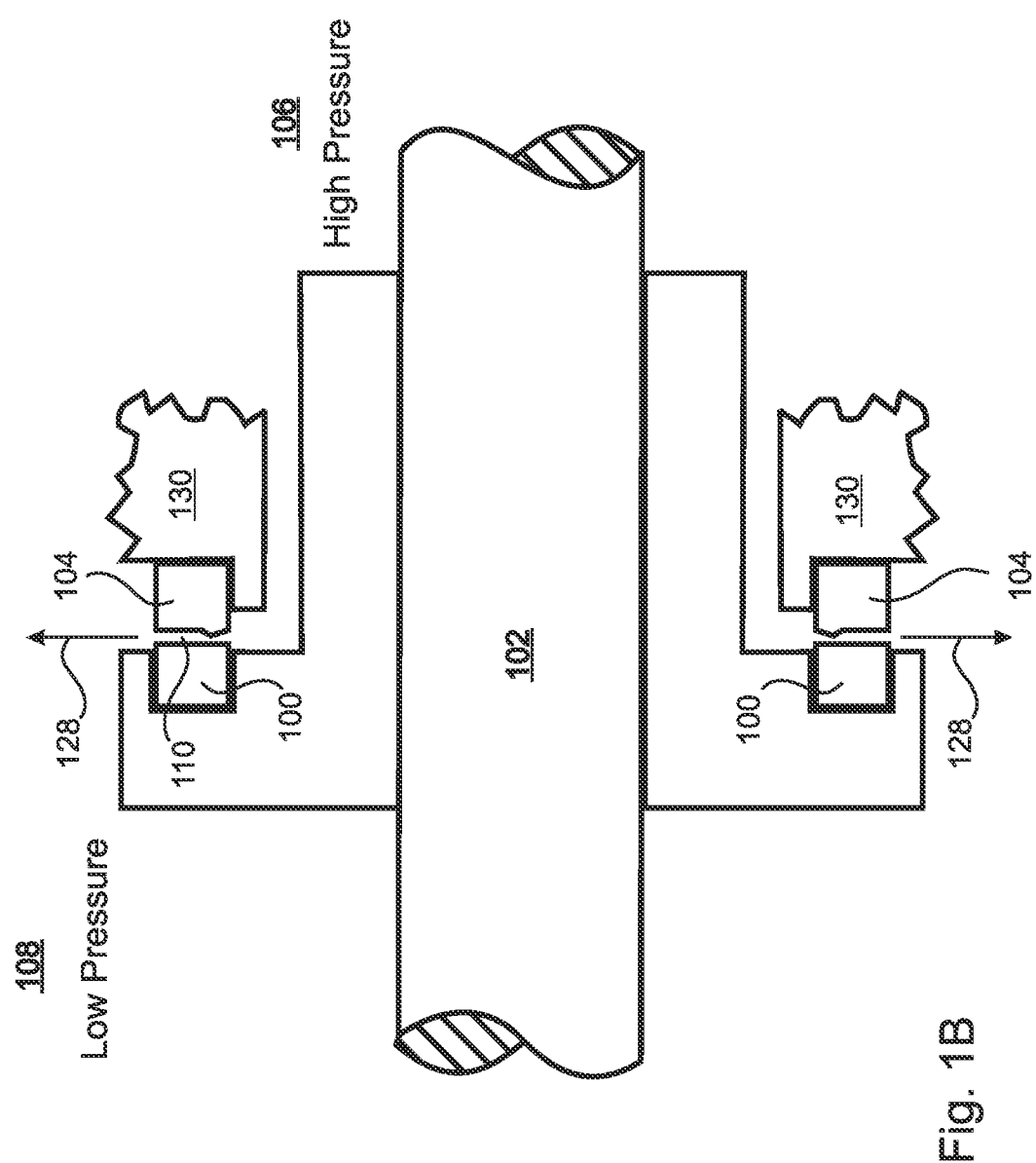
FIG. 1B is a cross-sectional side view of an embodiment of the present invention wherein the seal faces are opposing annular rings surrounding the shaft.

The present invention is an end face mechanical seal that is more efficient and effective than conventional end face mechanical seals in sealing high pressure and ultrahigh pressure and/or high temperature compressible fluids. With reference to FIGS. 1A and 1B, the present invention falls within the definition of an end face mechanical seal as given above, in that the present invention includes a rotating seal ring 100 fixed to or formed in a rotating shaft 102 that is located parallel with and closely adjacent to a stationary seal ring 104 that is fixed to a housing 130 or other surrounding, stationary structure. In addition, as is also the case with traditional end face mechanical seals, the seal rings 100, 104, or at least the opposing seal faces 112, 114 thereof, are made from a material having a Young's modulus of greater than 5 GPa, and in embodiments greater than 10 GPa, such as a metal or ceramic (where graphite is considered to be a ceramic).

As is the case with conventional end face mechanical seals, the present invention includes embodiments wherein the opposing seal faces 112, 114 of the seal rings 100, 104 are arranged coaxially about the rotating shaft 102, either as concentric tubes as shown in FIG. 1A or as opposing rings or annuli, as shown in FIG. 1B. In FIG. 1A, the seal faces 112, 114 of the seal rings 100, 104 are essentially cylindrical in shape and the leakage direction 128 is axial, i.e. parallel to the rotating shaft 102. Embodiments of this type are sometimes referred to herein as having "axial" configurations. In FIG. 1B, the opposing seal faces 112, 114 of the seal rings 100, 104 are essentially flat and annular in shape, and lie substantially in planes that are perpendicular to the rotating shaft 102, whereby the leakage direction is radial. Embodiments of this type are sometimes referred to herein as having "radial" configurations.

As is also true for conventional end face mechanical seals, the rotating 100 and stationary 104 seal rings of the present invention are separated during operation of the seal by a narrow "seal gap" 110 and do not touch, such that process fluid leaks very slowly through the seal gap 110 in a "leakage direction" 128 from a higher-pressure side 106 of the seal gap 110 to a lower pressure side 108 of the seal gap 110. The seal is configured such that the pressurized compressible fluid can only escape from the sealed volume 106 to the surrounding, lower pressure environment 108 by flowing in the leakage direction 128 through the seal gap 110.

According to the present invention, at least one of the seal faces 112, 114 of the seal rings 100, 104 includes shaping that creates one or more "supersonic regions" 126 within the seal gap 110. This shaping of at least one of the seal faces 112, 114 is in the leakage direction 128 of the seal gap 110 while, in embodiments, the width of the gap 110 does not vary in a direction perpendicular to the leakage direction 128. Accordingly, the supersonic region or regions 116, 118, 120 of the seal gap 110 are described herein in terms of two-dimensional "shape profiles" that present the gap width as a function of location within the supersonic region along the leakage direction. In the example of FIG. 1A, the fluid flows through three supersonic regions 116, 118, 120, within each of which the gap width 110 is uniform in the circumferential direction, while varying in the axial direction.

It should be noted that the first supersonic region 116 that is encountered by a fluid flowing in the fluid direction from the higher pressure side 106 of the seal gap is referred to herein as the "first" supersonic region 116. It will be understood, however, that references herein to the "first" supersonic region do not necessarily imply that a plurality of supersonic regions are included in the seal gap.

Figure 2:
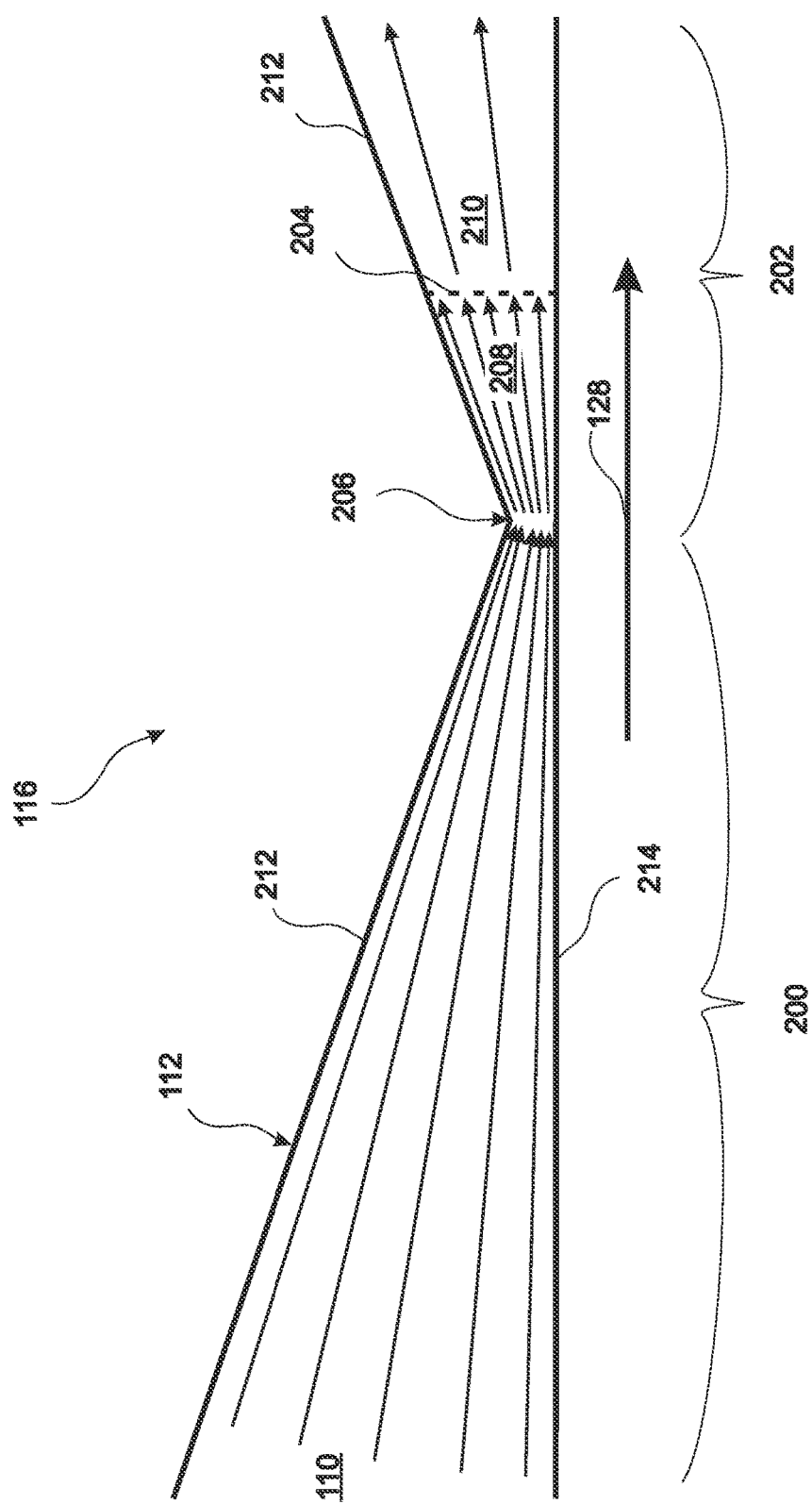
FIG. 2 is a cross-sectional side view illustrating compressible fluid flow through a single supersonic region in an embodiment of the present invention.

FIG. 2 illustrates the gap profile of the first supersonic region 116 of the embodiment of FIG. 1A. As with all of the supersonic regions 116, 118, 120, the first supersonic region 116 includes a converging segment 200 within which the gap 110 narrows in the leakage direction, followed by a diverging segment 202 within which the gap 110 widens. The width of the gap 110 therefore reaches a local minimum or "choke width" 206 at the location where the converging segment 200 ends and the diverging segment 202 begins. Within the first supersonic region 116, as with all of the supersonic regions 116, 118, 120, the fluid is thereby accelerated to a supersonic condition, such that a shockwave 204 is induced shortly after the fluid enters the diverging segment 202. The stagnation pressure of the fluid 210 downstream of the shockwave 204 is consequently decreased by the action of the shockwave, causing a backpressure that significantly reduces leakage of the fluid through the seal gap 110.

According to the present invention, the choke width in the first supersonic region is between 50 micro-inches and 200 micro-inches, while the overall length of all of the supersonic regions in combination 126 is less than 0.1 inches. In embodiments, the overall length of all of the supersonic regions in combination 126 is less than 0.01 inches In the embodiment of FIG. 2, the upper and lower boundaries 212, 214 of the gap profile of the first supersonic region 116 have constant slopes, i.e. are "flat," such that the width of the gap 110 within the converging 200 and diverging 202 segments of the first supersonic region 116 are a linear function of position in the leakage direction. According to the present invention, the sum of the absolute values of the slopes relative to the leakage direction of the upper 212 and lower 214 boundaries of the gap profile of the first supersonic region 116 is less than 10 degrees in both the converging segment 200 and the diverging 202 segment.

For example, in FIG. 2 one of the two seal faces 114 of the seal rings 100, 104 is "horizontal," i.e. parallel to the leakage direction 128, so that the lower boundary 114 of the gap profile is also flat and parallel to the leakage direction 128, while the absolute value of the slope of the upper boundary 212 of the gap profile relative to the leakage direction 128 is less than 10 degrees for both the converging 200 and diverging 202 sections of the supersonic region 116. As another example, in embodiments where the two seal faces of the seal rings are shaped as mirror images of each other within a supersonic region, having equal and opposite slopes, then none of the slopes of the seal faces will exceed 5 degrees.

Note that FIG. 2 is not drawn to scale, and that the slopes of the upper boundary 212 are exaggerated for ease of illustration.

The dimensions and the number of supersonic regions included in each embodiment are determined according to the fluid pressure within the sealed volume 106 and the desired relative pressure drop. For all embodiments, the overall length of all of the supersonic regions in total is less than 0.1 inches. In some embodiments, the overall length of all of the supersonic regions in total is less than 0.01 inches.

Figure 3:
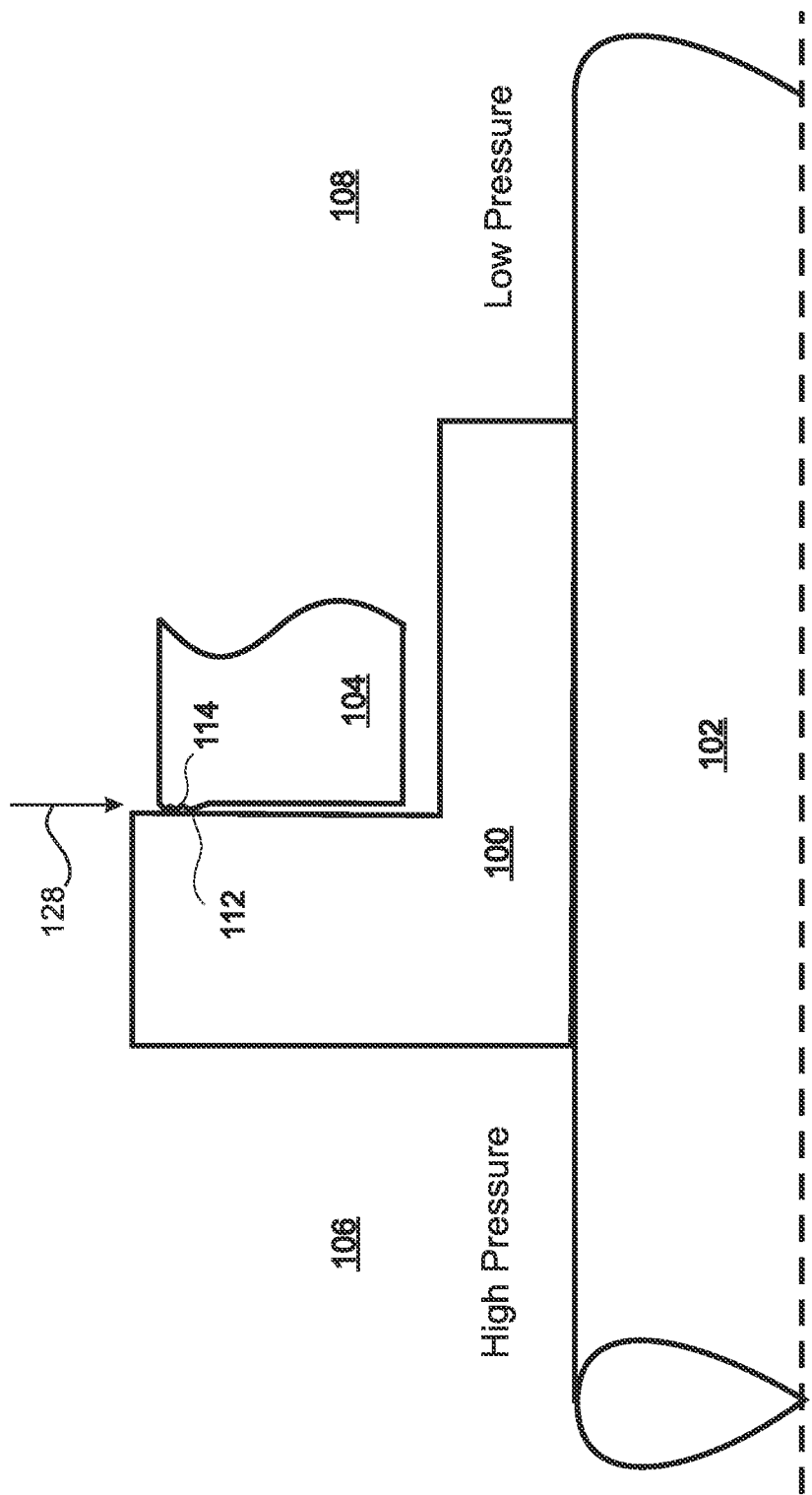
FIG. 3 is a cross-sectional side view of an embodiment of the present invention having a radial configuration.

The embodiment of FIG. 1A is configured axially, whereby the stationary seal ring 112 is the inner diameter of a stationary component 100 that surrounds a shaft 102, while the rotary seal ring 114 is the outer diameter of a rotating component 100 that surrounds and is fixed to the shaft 102. In the embodiments of FIG. 1B and FIG. 3, the seal rings 112, 114 are configured radially, whereby the seal rings 112, 114 are axially adjacent to each other, with one seal ring 100 being attached and sealed to the rotating shaft 102, and the other seal ring 104 being attached and sealed to the surrounding housing or other stationary assembly. In FIG. 3, the leakage direction is opposite to the leakage direction 128 of FIG. 1B.

In the embodiments of FIGS. 1A, 1B, and 3, the shaping of each supersonic region 116, 118, 120 is imposed entirely on one of the opposing seal faces 212 of the stationary seal ring 104, while in various other embodiments the shaping of each supersonic region is imposed on both of the seal faces. The configuration can be different for each supersonic region. For example, some embodiments are configured such that the shaping of the gap is imposed only on the seal face 114 of the stationary seal ring 104 in a first supersonic region, only on the seal face 112 of the rotating seal ring 100 in a second supersonic region, and on both seal faces 112, 114 in a third supersonic region.

Note that in the embodiment of FIGS. 1A, 1B, and 3, the supersonic regions 116 118, 120, are located near the edges of the seal rings 100, 104, where the fluid enters the seal gap 110 from the sealed fluid volume 106.

Principle of Operation

With reference again to FIG. 2, in each supersonic region 116, 118, 120 of the disclosed seal the compressible fluid is first accelerated within the converging segment 200 as the gap 110 narrows, until it reaches a minimum gap clearance referred to herein as the "choke width" 206. At this location, the fluid reaches a "choked" condition, where the fluid velocity cannot increase beyond Mach 1. As the fluid enters the diverging segment 202, the gap 110 widens, further accelerating the fluid to a supersonic condition, whereupon back-pressure imposed by downstream sections 210 induce a standing normal shockwave 204 in the diverging segment 202. Although the static pressure of the fluid 210 after the shockwave is much higher than the static pressure immediately upstream 208 of the shockwave 204, the stagnation pressure of the downstream fluid 210 is greatly reduced, and is a function of the maximum Mach number that is reached in the diverging segment 202 before the shock wave 204. The amount of pressure drop in each section is therefore limited by the maximum Mach number that is achievable in each section.

In some embodiments, a Mach number of 4 or higher can tend to result in dissociation of the fluid within the shockwave and along the walls, and may begin to cause significant viscous heating effects on the walls. Accordingly, embodiments are designed such that the maximum Mach number of each section is 3 or less. Under these conditions, each section results in a pressure drop of approximately 50%. Thus, to achieve a desired pressure drop across the seal gap, the number of supersonic regions is selected according to the requirements of the embodiment, with higher sealed fluid pressures typically requiring a greater number of supersonic regions.

In embodiments, the amount of fluid leakage through the seal gap is determined primarily by the choke width of the first supersonic region and the circumference thereof.

Referring again to FIG. 1A, if it is desirable to combine the disclosed shockwave pressure reduction mechanism with viscous-effect pressure reduction, then the seal rings 100, 104 can be extended downstream 108 of the supersonic regions 116, 118, 120 so as to create two sealing regions 122, 124, wherein the first sealing region 122 includes the supersonic regions 116, 118, 120 that reduce fluid pressure by inducing shock waves 206, and the second sealing region 124 further reduces the fluid pressure due to viscous dissipation within the seal ring gap 110, in the manner of a conventional end face mechanical seal.

Similarly, a seal operating according to the principles disclosed herein can be used as a "pre-conditioner," much like a throttle bushing, in combination with a conventional downstream fluid seal. In this way, a seal of the present invention can be used to enable existing seal technology that is well proven for sealing fluids at lower pressures to be applied in ultra-high-pressure applications.

Advantages

The present invention provides at least two significant technical advantages as compared to prior art end face mechanical seals. The first is the significant reduction in viscous heating associated with the action of the shockwaves 204 that reduce the fluid pressure. Although some viscous heating is unavoidable due to the small gap clearances required by the invention, the principle by which the invention operates does not depend upon viscous effects (other than the shockwaves) to reduce the fluid pressure, and so embodiments can be designed to minimize viscous heating. The second advantage is the short length scale of the supersonic regions 116, 118, 120, which for all embodiments is less than 0.1 inches in total, and in some embodiments is less than 0.01 inches in total, which can allow the seal rings 100, 104 to be scaled to very small sizes, reducing material costs and product envelopes.

Figure 4:
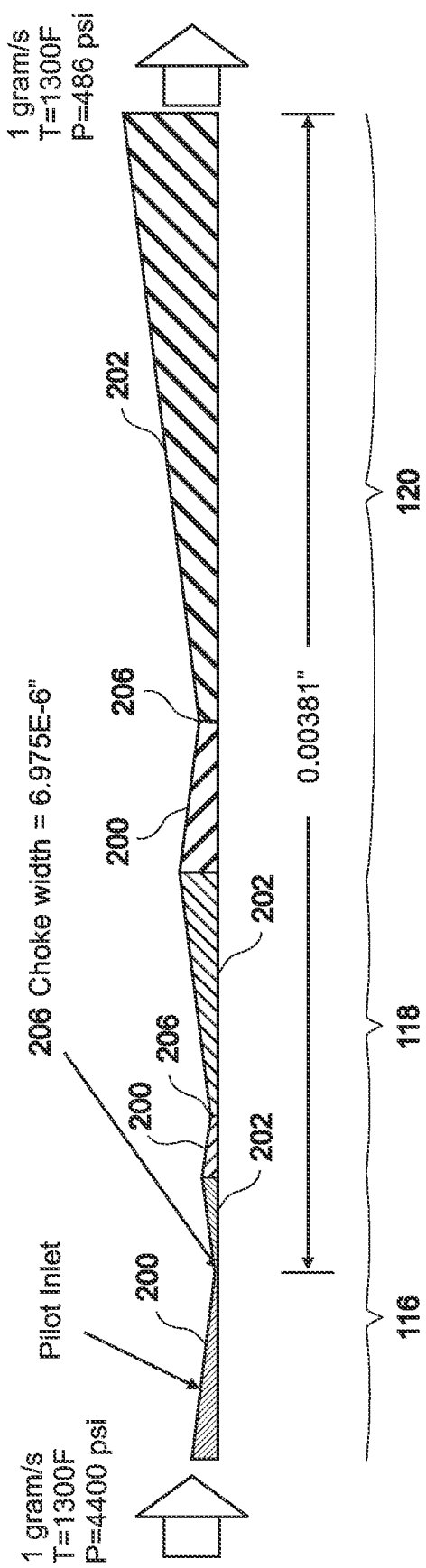
FIG. 4 is a cross-sectional side view illustrating a series of three supersonic regions in an axial embodiment that is suitable for sealing carbon dixoide at 1300 degrees Fahrenheit and 4400 psi pressure.

In the embodiment of FIG. 4, for example, a theoretically calculated result is illustrated for a radially configured embodiment similar to FIG. 1B that is suitable for sealing $CO_2$ at 1300 degrees Fahrenheit and 4400 psi pressure, with a flow rate through the gap 110 of 1 gram per second. In this simulation, viscosity effects are not taken into account.

Figure 5:
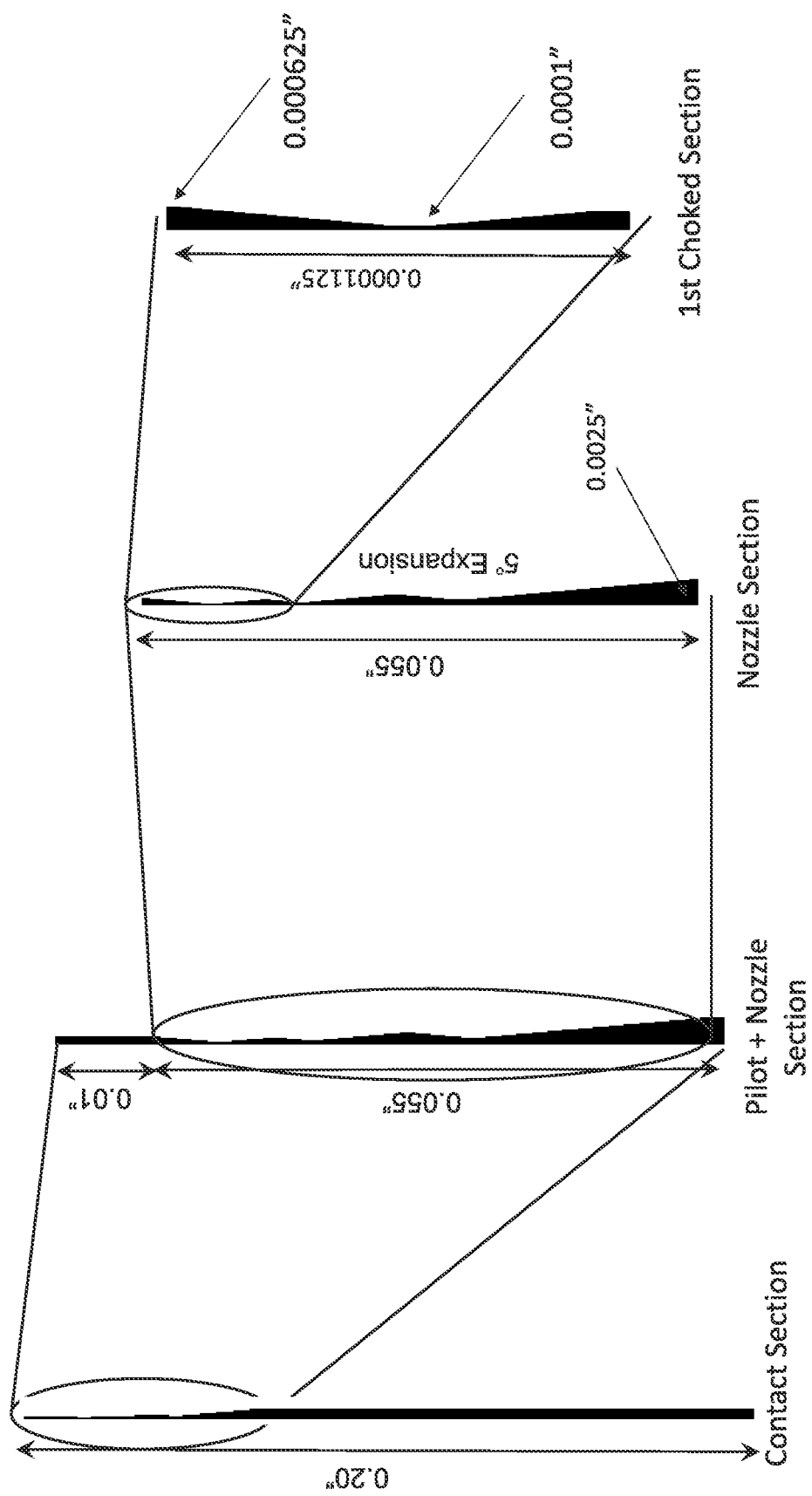
FIG. 5 is a series of side views that illustrate dimensions of the seal gap in a radial embodiment.

FIG. 5 illustrates dimensions of the gap 110 across its full width in a radially configured embodiment similar to FIG. 1B, where the fluid flow is from top to bottom in the figure.

Figure 6:
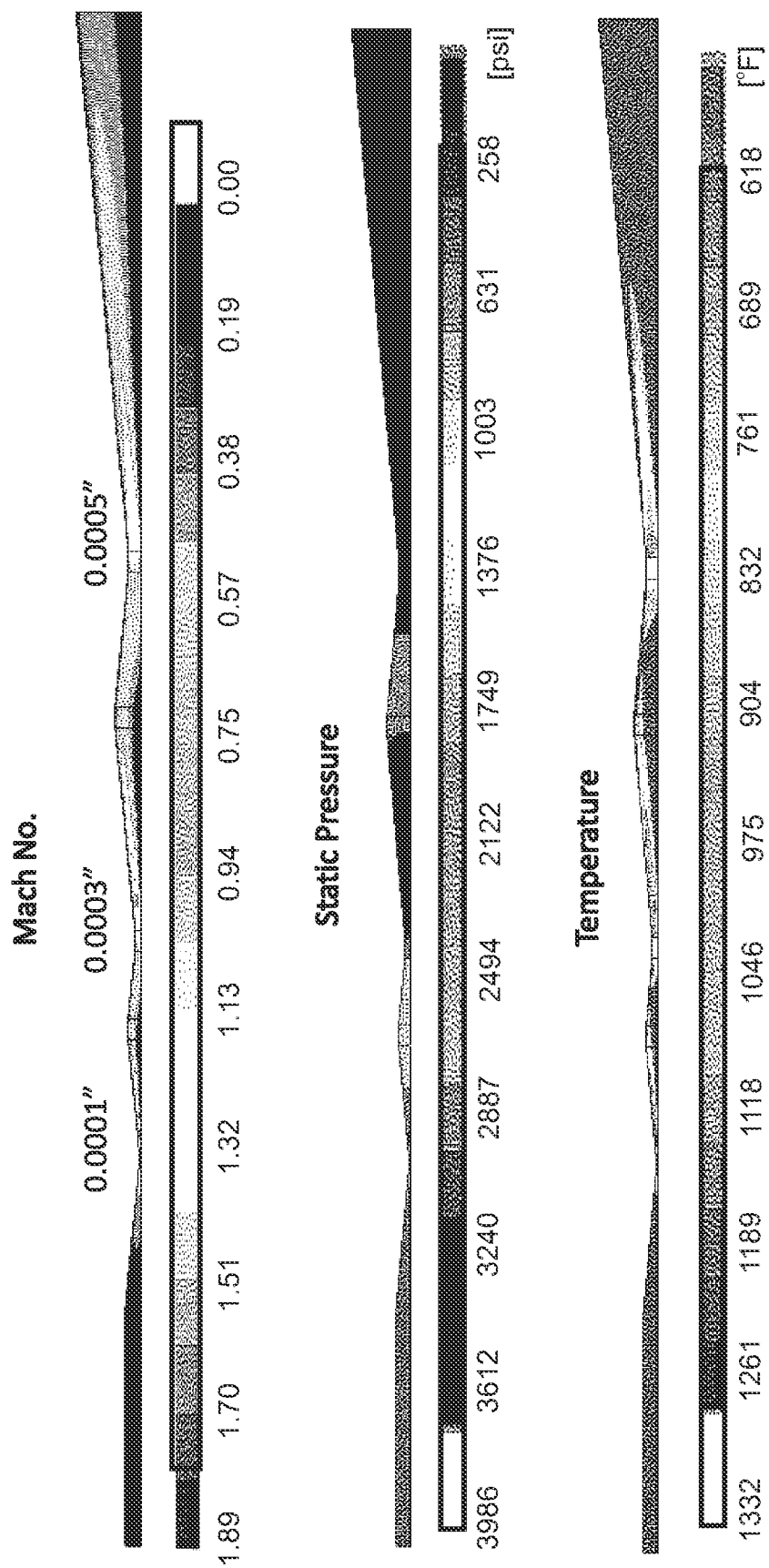
FIG. 6 is a graph that presents Mach number and pressure results of a flow simulation of a supersonic region of a radial configuration similar to FIG. 5.

FIG. 6 presents results of a flow simulation of the supersonic regions 116, 118, 120 of the axial configuration of FIG. 5. Viscosity effects are included in the simulation, which assumes that the gas is nitrogen at 1300 degrees Fahrenheit and 4000 psi pressure, and having a flow rate through the gap 110 of 34 grams per second. The choke width 206 of the first supersonic region 116 in this embodiment is 100 micro-inches, and the distance across all of the supersonic regions in total is 0.055 inches. The flow rate of the fluid through the gap is 34 g/s.

Figure 7:
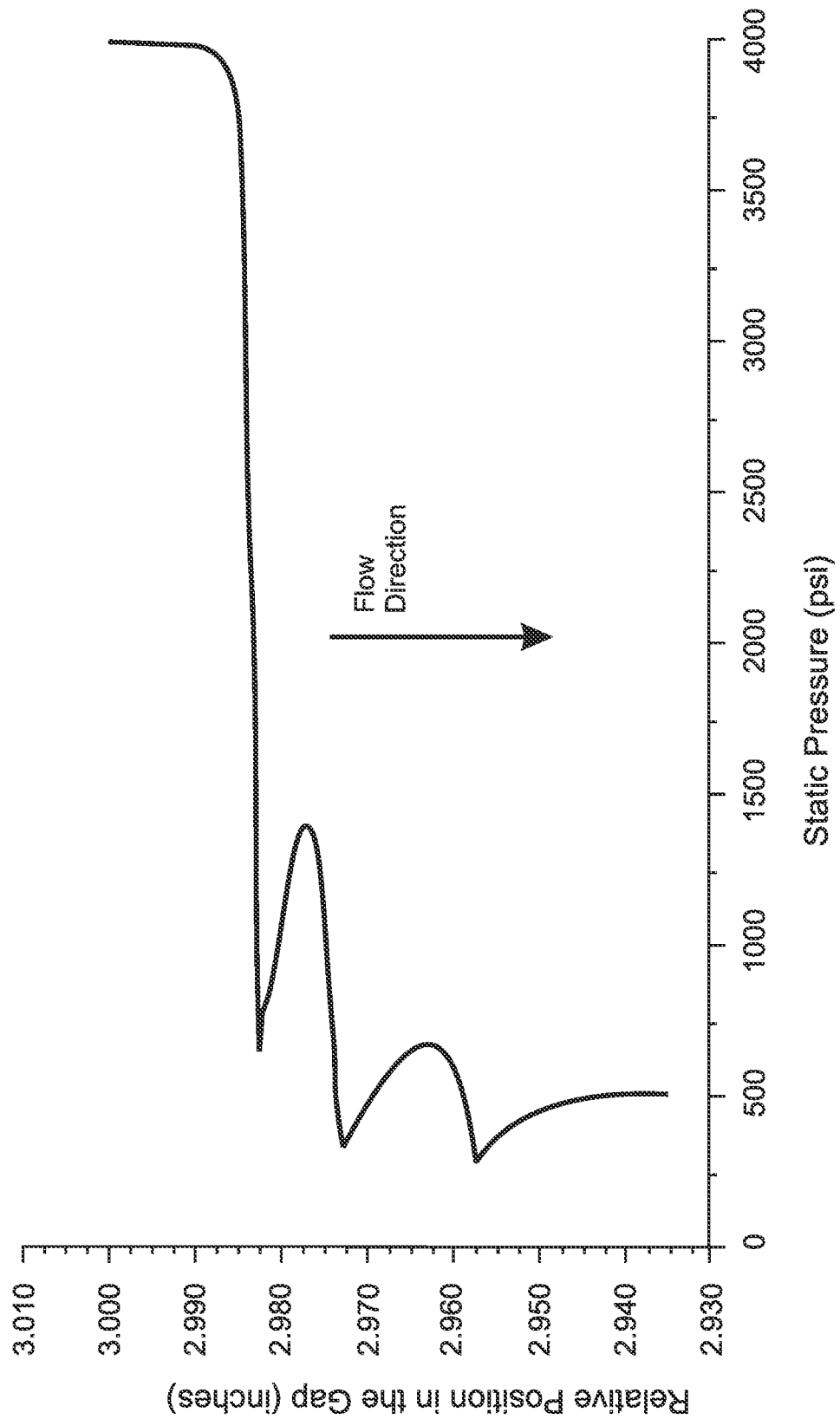
FIG. 7 is a graph that illustrates the pressure loss across the supersonic regions in the simulation of FIG. 6.

FIG. 7 is a graph that illustrates the pressure loss across the supersonic regions in the simulation of FIG. 6.

Figure 8:
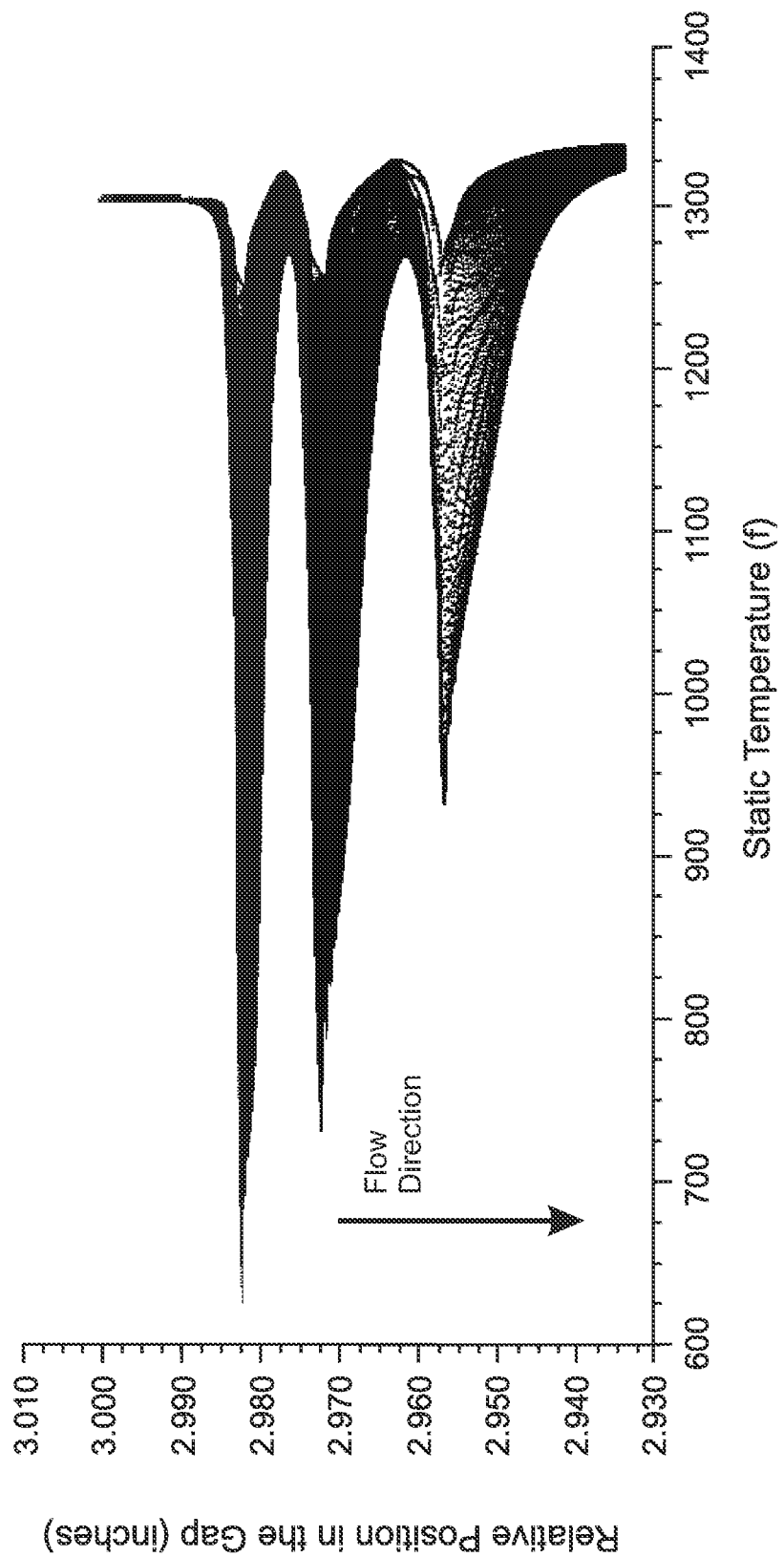
FIG. 8 is a graph that illustrates changes in temperature across the supersonic regions of the simulation of FIG. 6.

FIG. 8 is a graph that illustrates changes in temperature across the supersonic regions of the simulation of FIG. 6. The walls are considered to be adiabatic in this simulation, such that the result represents the highest possible temperatures. Close clearances at the inlet lead to high viscous heating and rapid temperature increases. These temperature increases can be controlled by increasing the clearance at the inlet and outlet, since the performance of the seal is not strongly dependent upon the clearance at the inlet and outlet of the contoured region of the gap. Other approaches to controlling the temperature included in various embodiments include selecting thermally conductive materials and/or active thermal management, for example by utilizing a cooling liquid.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application.

The invention illustratively disclosed herein suitably may be practiced in the absence of any element which is not specifically disclosed herein and is not inherently necessary. However, this specification is not intended to be exhaustive. Although the present application is shown in a limited number of forms, the scope of the invention is not limited to just these forms, but is amenable to various changes and modifications without departing from the spirit thereof. One of ordinary skill in the art should appreciate after learning the teachings related to the claimed subject matter contained in the foregoing description that many modifications and variations are possible in light of this disclosure. Accordingly, the claimed subject matter includes any combination of the above-described elements in all possible variations thereof, unless otherwise indicated herein or otherwise clearly contradicted by context. In particular, the limitations presented in dependent claims below can be combined with their corresponding independent claims in any number and in any order without departing from the scope of this disclosure, unless the dependent claims are logically incompatible with each other.

What is claimed is:

1. An end face mechanical seal configured for sealing a pressurized, compressible fluid, the end face mechanical seal comprising:

a stationary seal face cooperative with and sealed to a housing that is penetrated by a rotating shaft, the stationary seal face being generally parallel to a rotating seal face that is cooperative with the rotating shaft, both of the stationary and rotating seal faces being made from materials having a Young's modulus that is greater than 5 GPa, the rotating and stationary seal faces being separated from each other by a seal gap extending in a leakage direction from a higher pressure side of the seal gap to a lower pressure side of the seal gap, the seal gap having a gap width that is everywhere constant in a direction perpendicular to the leakage direction, the gap width being characterized by a gap profile in the leakage direction; and plurality of supersonic region included in the seal gap, said plurality of supersonic regions encountered by the compressible fluid as it flows from the higher pressure side of the seal gap to the lower pressure side of the seal gap, each of the supersonic regions comprising:

a converging segment within which the gap width decreases in the leakage direction; a diverging segment immediately following the converging segment within which the gap width increases in the leakage direction, a local gap width minimum between the converging and diverging segments being referred to herein as a choke width;

for each of the supersonic regions, the converging and diverging segments thereof being configured to cause the compressible fluid when flowing through the seal gap in the leakage direction to be accelerated within the supersonic region into a supersonic state, so that a shockwave is formed by the compressible fluid within the diverging segment, thereby reducing a stagnation pressure of the compressible fluid;

wherein the choke width of the first supersonic region is between 50 micro-inches and 200 micro-inches;

wherein a total width of all of the supersonic regions is less than 0.1 inches; and wherein upper and lower boundaries of the gap profile in the converging and diverging segments of the first supersonic region have constant slopes, a sum of the absolute values of the constant slopes relative to the leakage direction being less than 10 degrees in each of the converging and diverging segments of the first supersonic region.

2. The end face mechanical seal of claim 1, wherein both of the seal faces are made from materials having a Young's modulus that is greater than 10 GPa.

3. The end face mechanical seal of claim 1, wherein each of the seal faces is made from either a metal or a ceramic.

4. The end face mechanical seal of claim 1, wherein the stationary seal face is a surface of a bushing that surrounds the rotating shaft.

5. The end face mechanical seal of claim 1, wherein the rotating seal face is a surface of a rotating seal ring that surrounds the rotating shaft, and is rotationally cooperative with and sealed to the rotating shaft.

6. The end face mechanical seal of claim 1, wherein the first supersonic region is located proximal to the higher pressure side of the seal gap.

7. The end face mechanical seal of claim 1, wherein the end face mechanical seal is axially configured, such that the seal faces are concentric about the rotating shaft and radially offset from each other.

8. The end face mechanical seal of claim 7, wherein the rotating seal face is formed in an outer surface of the rotating shaft.

9. The end face mechanical seal of claim 1, wherein the end face mechanical seal is radially configured, such that the seal faces are perpendicular to the rotating shaft and axially offset from each other.

10. The end face mechanical seal of claim 1, wherein at least one of the supersonic regions is configured to cause the compressible fluid when flowing through the seal gap in the leakage direction to be accelerated into a supersonic state having a Mach number of less than 4.

11. The end face mechanical seal of claim 1, further comprising a viscosity-inducing section included in the seal gap, the viscosity-inducing section being offset in the leakage direction from all of the supersonic regions, the seal faces in the viscosity-inducing section being configured to induce viscous stresses on the compressible fluid within the viscosity-inducing section, thereby further reducing a stagnation pressure of the compressible fluid.

12. The end face mechanical seal of claim 1, wherein at least one of the seal faces is parallel to the leakage direction throughout the seal gap.

13. The end face mechanical seal of claim 1, wherein the total width of all of the supersonic regions is less than 0.01 inches.

\* \* \* \* \*